United States Patent [19]
Matviya et al.

[11] Patent Number: 5,827,795
[45] Date of Patent: Oct. 27, 1998

[54] CO-IMPREGNANT PROCESS FOR MAKING CATALYTIC CARBONS

[75] Inventors: Thomas M. Matviya; Richard A. Hayden, both of Pittsburgh, Pa.

[73] Assignee: Calgon Carbon Corporation, Pittsburgh, Pa.

[21] Appl. No.: 757,212

[22] Filed: Nov. 27, 1996

Related U.S. Application Data

[63] Continuation-in-part of Ser. No. 342,817, Nov. 21, 1994.
[51] Int. Cl.$^6$ ....................................... B01J 21/18
[52] U.S. Cl. ........................................ 502/180; 423/445 R
[58] Field of Search .................................. 502/423, 416, 502/437, 180; 423/445 R; 428/408

[56] References Cited

U.S. PATENT DOCUMENTS

| | | | |
|---|---|---|---|
| 4,259,167 | 3/1981 | Liotta | 208/430 |
| 5,444,031 | 8/1995 | Hayden | 423/579 |

*Primary Examiner*—Michael L. Lewis
*Assistant Examiner*—Stuart L. Hendrickson
*Attorney, Agent, or Firm*—Titus & McConomy LLP

[57] ABSTRACT

A process is provided for the manufacture of a carbonaceous char capable of catalyzing the rapid decomposition of hydrogen peroxide in aqueous solutions. This carbonaceous char is produced from a bituminous coal or a bituminous material that has been carbonized and extensively oxidized at low temperatures (less than 700° C.). The resultant carbonized and oxidized bituminous coal or bituminous material is then contacted with a nitrogen-containing compound in combination with an aliphatic organic compound containing both ether and alcohol functionalities as the temperature of the low-temperature char is increased to minimally 700° C. This treatment results in a high-temperature char which may then be activated as desired. These activated chars show the aforementioned ability to rapidly decompose aqueous solutions of hydrogen peroxide and are also useful for the catalytic chemical conversion of $H_2S$, $SO_x$, $NO_x$, chloramines, and/or peroxides in liquid and/or gaseous streams.

10 Claims, 1 Drawing Sheet

CO-IMPREGNANT PROCESS FOR MAKING CATALYTIC CARBONS

This is a c-i-p of Ser. No. 08/342,817, filed Nov. 21, 1994.

FIELD OF THE INVENTION

The present invention relates to a process for the manufacture, from a bituminous coal or bituminous material, of a carbonaceous char which catalyzes the rapid decomposition of hydrogen peroxide in aqueous solutions.

BACKGROUND OF THE INVENTION

Carbons which are capable of functioning as catalysts per se are well known. For example, as early as 1867 Calvert observed that the presence of charcoal enhanced a variety of oxidation reactions, including the oxidation of hydrogen sulfide, phosphine, and various organics. When carbon has been observed to affect such reactions, it has functioned as a true catalyst, i.e., it affects only the rate of a given reaction but is not itself changed by the reaction to any significant degree.

It is also known that carbon chars prepared from nitrogen-rich starting materials are much more effective in catalyzing certain reactions than those prepared from nitrogen-poor feedstocks. Also, enhanced catalytic properties can be imparted to high-temperature chars prepared from nitrogen-poor starting materials by simply exposing such chars to nitrogen-containing compounds such as ammonia at high temperatures. High-temperature chars are those prepared at temperatures equal to or greater than 700° C. while low-temperature chars are prepared at temperatures less than 700° C. A number of investigators have prepared catalytically-active chars by the simple calcination or calcination/activation of low- or high-temperature chars prepared from nitrogen-rich materials such as polyacrylonitrile and polyamide.

More recently, the oxidation of high-temperature chars prepared from nitrogen-poor feedstocks before or during exposure to nitrogen-containing compounds has been demonstrated. Similarly, the oxidation of a low-temperature char prepared from nitrogen-rich feedstocks such as polyacrylonitrile has been evaluated. Further, it is known that a carbonaceous char may be prepared by heating bituminous coal in the presence of an oxidant and water. Nonetheless, such chars do not possess the enhanced catalytic properties of the present invention.

All of the prior art processes for preparing carbons which are catalytically active per se have certain disadvantages which limit their overall utility and practicality. For example, some use nitrogen-rich starting materials such as polyacrylonitrile or polyamide. Such materials are expensive and have been found to generate large amounts of cyanide and other toxic gases upon carbonization. Those that use chars derived from nitrogen-poor starting materials invariably also use high-temperature chars, such as activated carbons, which require furter processing. Since such materials are fairly inert chemically, the use of extensive and aggressive chemical post-treatments is usually required to effect significant changes in their catalytic capabilities. The use of high-temperature chars is, therefore, inevitably more expensive than the direct use of the raw materials from which they are derived. Additionally, such processes use large amounts of toxic and/or hazardous reagents such as nitric acid, sulfuric acid, ammonia, or toluene diisocyanate, and generate significant amounts of toxic and/or hazardous byproducts such as sulfur dioxide, nitric oxide, and cyanide.

Accordingly, it is the object of the present invention to provide an improved process for the manufacture of a catalytically-active carbon wherein the carbon catalyst is prepared directly from an inexpensive and abundant nitrogen-poor starting material such as a bituminous coal or a bituminous material. It is further the object of the present invention to limit the use of agents responsible for imparting catalytic activity to the carbon by performing the essential treatments during the low-temperature transition of the starting material to the final product. These treatments include oxidation of the low-temperature char, preferably by inexpensive, abundant, and relatively non-toxic oxidants. The oxidized, low-temperature char is then contacted with small amounts of an inexpensive, abundant, and relatively non-toxic nitrogen-containing compound in combination with an aliphatic organic compound containing both ether and alcohol functionalities before or during, not after, the initial exposure of the oxidized char to temperatures greater than 700° C. By this method carbon materials with high catalytic activity per se for a variety of chemical reactions can be manufactured relatively inexpensively and conveniently, with minimal departure from conventional processes for the manufacture of high-temperature carbon chars such as activated carbons and cokes.

SUMMARY OF THE INVENTION

The present invention comprises a process for the manufacture of a carbon having significant catalytic properties per se wherein the carbon catalyst is prepared directly from an inexpensive and abundant nitrogen-poor feedstock such as a bituminous coal or a bituminous material such as those derived from higher or lower rank bitumens and coals and ligno-cellulose materials by various chemical treatments. Examples of higher rank coals include anthracite and semi-anthracite coals while examples of lower rank coals include peat, lignite, and sub-bituminous coals. Examples of the chemical treatment of these feedstocks include treatment of the high rank materials with alkali metals such as potassium and sodium and treatment of the low rank materials with metal salts such as zinc chloride or with acids such as phosphoric acid. These types of treatments can also be applied to ligno-cellulose materials. The metals used may assist with the carbonization process, but, unlike other processes, do not perform the catalytic function in the present invention. Importantly, these metals are removed either before, during or after the carbonization and oxidation steps of the present invention, and before treatment with nitrogen-containing compounds.

In the preferred embodiment of the invention, the feedstock material is pulverized, mixed if necessary with a small amount of a suitable binder such as pitch, briquetted or otherwise formed, and sized. The sized material is then extensively oxidized with an inexpensive, abundant, and relatively non-toxic oxidant such as air at temperatures less than 700° C., preferably less than 400° C. The oxidation is continued until additional gains in the catalytic activity of the final product are no longer evident. The oxidation is well beyond that required to remove the coking properties of typical bituminous coals, and produces a highly oxidized low-temperature carbonaceous char. Other convenient means of oxidation can also be used to effect the low-temperature oxidation and carbonization of the starting material.

The oxidized low-temperature char, devoid of any added metals, is then contacted with small amounts of an inexpensive, abundant, and relatively non-toxic nitrogen-containng compound such as urea in combination with an organic aliphatic ether-alcohol before or during, not after, exposure of the highly oxidized char to temperatures greater than or equal to 700° C. Aliphatic ether-alcohols are those organic compounds which contain no unsaturated carbon-to-carbon bonding and at least one ether functional group and one alcohol functional group. Typical examples of such compounds include saccharides, such as sucrose and ribose, and linear poly ether-alcohols such as polyethylene glycol (PEG). The amount of nitrogen-containing compound used is typically small, preferably less than 5% by weight of the oxidized low-temperature char or such that additional gains in the catalytic activity of the final product are no longer evident. The amounts of the aliphatic ether-alcohol compound, hereinafter termed the "co-impregnant," are also typically small. Effective amounts can be as little as about one-half by weight of that amount of applied nitrogen-containing compound although higher levels may prove to be more effective. It has been found that the co-impregnant may be conveniently applied to the oxidized low-temperature char by means of an aqueous solution. When applied in this manner, the solution solute concentration should be adjusted such that the solution viscosity is low enough to provide for uniform distribution within the structure of the oxidized char.

The initial exposure of the oxidized low-temperature char to temperatures greater than or equal to 700° C., preferably between 850° C. and 950° C., is carried out while maintaining contact of the char with both the nitrogen-containing compound and the co-impregnant. Such thermal treatment is commonly referred to as "calcination". This calcination, or heating to high temperatures, is preferably conducted under an atmosphere that is inert except for the gases and vapors attributable to the char and/or the nitrogen-containing compound and/or the co-impregnant. The heating rate and temperatures are selected such that additional gains in the catalytic activity of the final product are no longer evident. The resultant high-temperature char may then be activated to the desired density and yield at temperatures above 700° C., preferably above 900° C., in steam and/or carbon dioxide, with or without the addition of other gasifying agents such as air or oxygen. The calcined or calcined/activated char is then cooled in an oxygen-free or otherwise inert atmosphere to temperatures less than 400° C., preferably less than 100° C. Additional gains in catalytic activity may be realized by repeating the oxidation, exposure to nitrogen-containing compound and co-impregnant, calcination or calcination/activation, and inert cooling as many times as may be desired. Alternatively, any other method known to generate catalytic activity in high-temperature chars may be applied to the resultant product to further enhance its catalytic activity.

EXAMPLES

Figure 1:
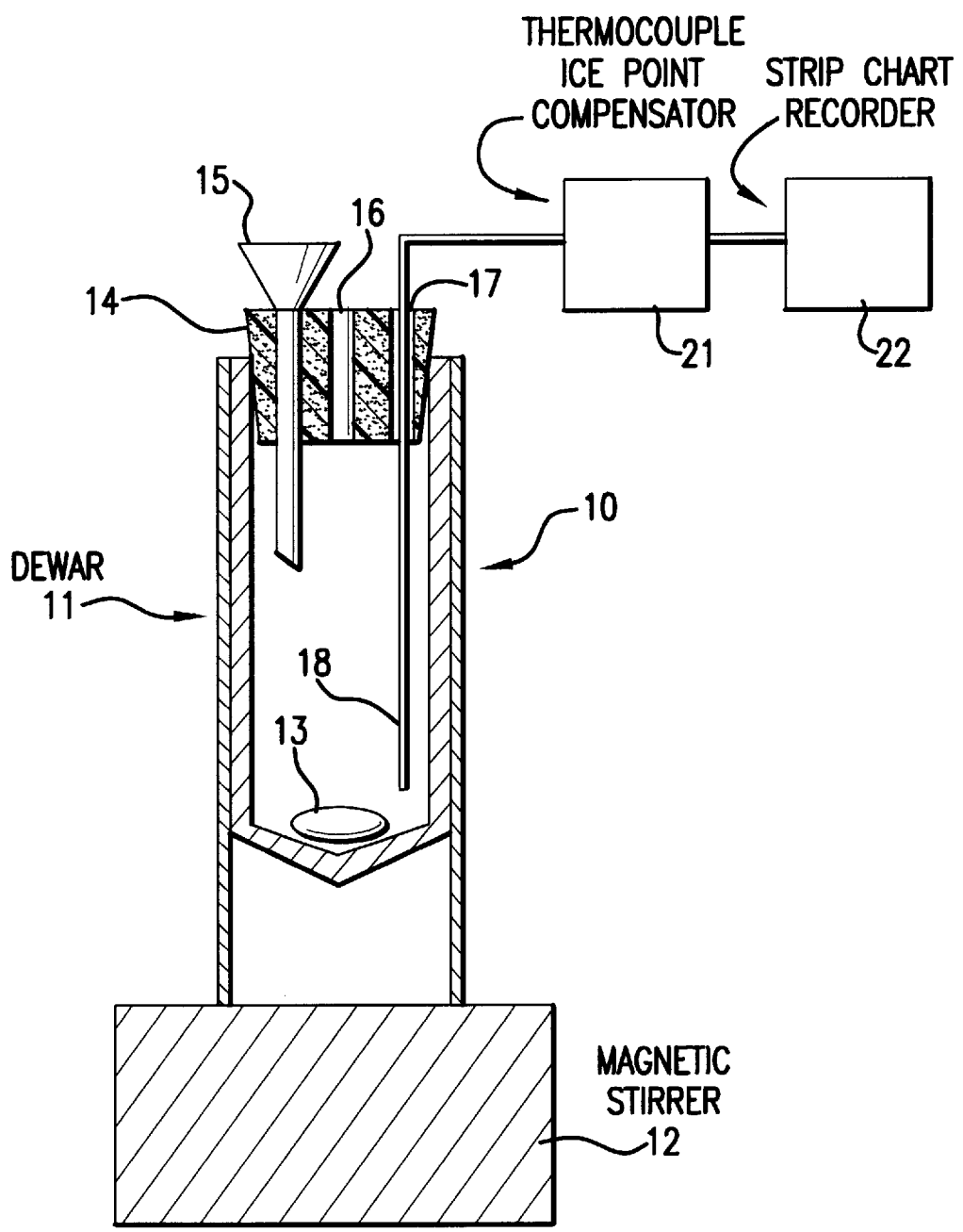
FIG. 1 is a diagrammatic view of a representative apparatus for measuring the catalytic activity of carbonaceous chars.

The following examples illustrate the practice of the invention, particularly the treatment of an oxidized, low-temperature char by a nitrogen-containing compound in combination with an aliphatic ether-alcohol co-impregnant.

Example 1

Bituminous coal was pulverized, mixed with about 4 to 6 weight percent coal tar pitch, and briquetted. The resultant briquettes were crushed and sized. In the presence of excess air, i.e., an amount of air beyond that required to just remove the coking properties of the briquettes, this material was oxidized by increasing the temperature of the material from approximately 100° C. to 400° C. over a period of about five hours. The resultant oxidized char material was subsequently sized to greater than five mesh and divided into sixteen equivalent portions for further processing.

Three of these sixteen equivalent portions were impregnated with water such that the water loading amounted to approximately 11–13% of the initial oxidized char weight. The impregnated oxidized chars were next dried in air at about 105°–110° C. to remove the added water. The dried, oxidized chars were then rapidly heated to 950° C. under an inert gas atmosphere and maintained at that temperature for 20 minutes. Immediately following this calcination treatment the materials were contacted with steam, while maintaining a 950° C. temperature, for a period of time sufficient to achieve an Apparent Density (A.D.) (Test Method TM-7, Calgon Carbon Company, Pittsburgh, Pa.) in the resultant product of approximately 0.5 grams per cc when sized to less than 4 and greater than 6 mesh (U.S. Standard Series sieves). After treatment with steam, the materials were cooled to near-ambient temperature in a nitrogen gas atmosphere.

The catalytic activities of the resultant samples were determined by measuring the time required for a portion of each of the product carbonaceous chars to decompose a given quantity of hydrogen peroxide. This measurement was accomplished using the apparatus shown in FIG. 1. In practice, the carbon to be tested is first pulverized such that greater than 90% of the material would pass through a 325 mesh U.S. Standard Series sieve. The styrofoam cap of the apparatus illustrated in FIG. 1 is then removed and a 0.250 gram portion of this pulverized material is placed in the Dewar (Catalog Number 10-195A, Fisher Scientific, Pittsburgh, Pa., or similar). Deionized water (100 ml) is then added to the Dewar. The addition of this water is performed in such a manner that any pulverized carbon clinging to the sides of the Dewar is carried into the main body of the water in the bottom of the Dewar. Next, a 50 ml aliquot of buffer solution is added to the Dewar. This buffer solution is 0.500 molar in $K_2HPO_4$ and 0.500 molar in $KH_2PO_4$.

At this point a magnetic stir bar is placed into the Dewar and the magnetic stirrer (Model PC-351, Corning Hot Plate Stirrer, Corning Scientific Products or Model 18425 Nuova II Stir Plate, Thermolyne Corporation, Dubuque, Iowa, or similar), is energized. Stirring speed is increased until a vortex minimally greater than ¼" deep is formed in the mixture. The stirring speed is also selected such that further increases in stirring speed will cause no change in the t-¾ time. If the stir bar decouples from the magnetic field before the desired stirring rate is achieved, it is replaced with a bar having a stronger magnetic field. Optionally, the Dewar can be replaced with an equivalent unit that, due to manufacturing variances, positions the stir bar further into the magnetic field of the stir plate. If the stir bar still does not adequately couple with the stir plate magnetic field, the Dewar can be shortened by removing some of the bottom portion of the outside metal casing. At this point the styrofoam cap is replaced on the Dewar, the thermocouple (Type K or J, 1/16" diameter, Inconel sheathed, ungrounded or similar) inserted through the styrofoam cap and into the mixture such that a measurement representative of the mixture temperature is obtained, and the thermocouple ice point compensator (Model MCJ-J or MCJ-K, Omega Engineering, Inc., Stamford, Conn. or similar) and strip chart recorder are energized. The strip chart recorder tracing is monitored until the system comes to thermal equilibrium at ambient temperature.

After thermal equilibrium is achieved, 50 ml of a hydrogen peroxide solution (0.418 moles $H_2O_2$ per 50 ml) is added to the Dewar through the funnel in the styrofoam cap. Care is taken to ensure that the hydrogen peroxide solution is at ambient temperature before the addition. As the hydrogen peroxide solution is added to the Dewar, the strip chart recorder tracing is marked to indicate the time of addition. The strip chart recorder tracing is monitored until the tracing indicates a constant temperature above ambient has been reached. At this point, the styrofoam cap is removed from the Dewar and the action of the stir bar is observed.

If the stir bar is no longer mixing the solution in the desired manner, the entire procedure is repeated. If adequate mixing is observed, the elapsed time required for the recorder tracing to reach 75% of its maximum, constant, deflection is determined. This value represents the time required for the catalytically-active carbonaceous char to decompose three-fourths of the available hydrogen peroxide and is referred to as the t-¾ time. Therefore, the lower the t-¾ time, the higher is the catalytic activity of the carbonaceous char. This t-¾ time value is reported in units of minutes. The catalytic activity (t-¾ time) of the carbons prepared as described above, when determined using this method, are given in Table 1. These carbons are designated in Table 1 as samples A, B and C. The results shown for these carbons represent results obtainable for prior art activated carbons which have not been exposed to nitrogen-containing compounds added during manufacture.

Example 2

Three of the thirteen remaining equivalent portions of oxidized char prepared as described in Example 1 were impregnated with an aqueous solution of urea and then dried in air at 105°–110° C. to remove the water used in the impregnation. The amount of urea added was sufficient to produce a urea loading after drying of approximately 4–6% of the initial oxidized char weight. After drying, the impregnated, oxidized chars were rapidly heated to 950° C. under an inert gas atmosphere and maintained at that temperature for 20 minutes. Immediately following this calcination treatment the materials were contacted with steam, while maintaining a 950° C. temperature, for a period of time sufficient to achieve an Apparent Density (A.D.) (Test Method TM-7, Calgon Carbon Company, Pittsburgh, Pa.) in the product char of approximately 0.5 grams per cc when sized to less than 4 mesh and greater than 6 mesh (U.S. Standard Series sieves). After treatment with steam, the materials were cooled to near-ambient temperature under an inert atmosphere and subsequently sized.

The catalytic activities of the chars produced were determined using the same method as described in Example 1. The results of this determination are presented in Table 2. The t-¾ times for the samples shown in Table 2, designated as samples D, E, and F, clearly show that impregnation with urea results in improved catalytic activities (i.e. lower t-¾ times) relative to the non-urea treated control samples prepared as described in Example 1 (Table 1).

Example 3

Eight of the ten remaining equivalent portions of oxidized char prepared as described in Example 1 were impregnated, respectively, with aqueous solutions of sucrose, fructose, dextrose, ribose, mannose, lactose, galactose, or maltose, and then dried in air at 105°–110° C. to remove the water used in the impregnation. The amount of impregnant added was sufficient to produce a loading after drying of approximately 2–3% of the initial oxidized char weight. After drying, each of the impregnated oxidized chars was impregnated with an aqueous urea solution in the same manner described in Example 2. The impregnated chars were then dried in air once again at 105°–110° C. to remove the water used in the impregnation. After drying, the impregnated, oxidized chars were then rapidly heated to 950° C. under an inert gas atmosphere and maintained at that temperature for 20 minutes. Immediately following this calcination treatment, the materials were contacted with steam, while maintaining a 950° C. temperature, for a period of time sufficient to achieve an Apparent Density (A.D.)(Test Method TM-7, Calgon Carbon Company, Pittsburgh, Pa.) in the product char of approximately 0.5 grams per cc when sized to less than 4 mesh and greater than 6 mesh (U.S. Standard Series sieves). After treatment with steam, the materials were cooled to near-ambient temperature under an inert atmosphere and subsequently sized.

The catalytic activities of the chars so produced were determined using the same method as described in Example 1. The results of this determination are presented in Table 3. The t-¾ times for the samples shown in Table 3, designated as samples G, H, I, J, K, L, M, and N, clearly show that impregnation with urea and a saccharide results in improved catalytic activities (i.e. lower t-¾ times) relative to either the urea-treated or the non-urea treated control samples prepared as described in Examples 2 and 1 (Tables 2 and 1), respectively.

Example 4

The two remaining equivalent portions of oxidized char prepared as described in Example 1 were impregnated, respectively, with an aqueous solution of polyethylene glycol (PEG) 1000 and PEG 4000, and then dried in air at 105°–110° C. to remove the water used in the impregnation. The amount of impregnant added was sufficient to produce a loading after drying of approximately 2–3% of the initial oxidized char weight. After drying, each of the impregnated oxidized chars was impregnated with an aqueous urea solution in the same manner described in Example 2. The impregnated chars were then dried in air once again at 105°–110° C. to remove the water used in the impregnation. After drying, the impregnated, oxidized chars were then rapidly heated to 950° C. under an inert gas atmosphere and maintained at that temperature for 20 minutes. Immediately following this calcination treatment the materials were contacted with steam, while maintaining a 950° C. temperature, for a period of time sufficient to achieve an Apparent Density (A.D.)(Test Method TM-7, Calgon Carbon Company, Pittsburgh Pa.) in the product char of approximately 0.5 grams per cc when sized to less than 4 mesh and greater than 6 mesh (U.S. Standard Series sieves). After treatment with steam, the materials were cooled to near-ambient temperature under an inert atmosphere and subsequently sized.

The catalytic activities of the chars produced were determined using the same method as described in Example 1. The results of this determination are presented in Table 4. The t-¾ times for the samples shown in Table 4, designated as samples O and P, clearly show that impregnation with urea and PEG results in improved catalytic activities (i.e. lower t-¾ times) relative to either the urea-treated or the non-urea treated control samples prepared as described in Examples 2 and 1, (Tables 2 and 1) respectively.

What is claimed is:

1. A process for the manufacture of a catalytically-active carbonaceous char containing no added metals supported thereon which comprises the steps of:
   a. carbonizing a bituminous material at temperatures below 700° C., said bituminous material selected from the group consisting of (i) bituminous coals, (ii) anthracite or semi-anthracite coals or bitumens chemically treated with alkali metals, and (iii) sub-bituminous coals, bitumens, peat, lignite or ligno-cellulose materials chemically treated with acids or metal salts;
   b. oxidizing said carbonized bituminous material at temperatures below 700° C. during or after said carbonization; and
   c. when said alkali metals or said metal salts which may have been added prior to step (a) have been removed either before, during or after said carbonizing and said oxidizing, contacting the carbonized and oxidized bituminous material with a nitrogen-containing compound and an organic aliphatic ether-alcohol compound and, during or after said contacting, increasing the temperature minimally to 700° C.

2. The process as set forth in claim 1 further including step (d) which comprises further treating said catalytically-active carbonaceous char at temperatures above 700° C. using one of $H_2O$, $CO_2$, $O_2$, or mixtures thereof.

3. The process of claim 2 wherein steps (c) and (d) are carried out simultaneously.

4. The process of claim 2 wherein step (c) is carried out before step (d).

5. The process of claim 1 wherein said nitrogen-containing compound is urea or any nitrogen-containing compound in which nitrogen has a formal oxidation number less than 0, wherein H is +1 for purposes of assigning an oxidation number.

6. The process of claim 1 wherein said organic aliphatic ether-alcohol compound is a saccharide or a polyoxyethylene glycol.

7. The process of claim 1 further including step (d) which comprises cooling the catalytically-active carbonaceous char to temperatures less than 400° C. under a substantially oxygen-free or inert atmosphere.

8. The process of claim 1 further including step (d) which comprises cooling the catalytically-active carbonaceous char to temperatures less than 100° C. under a substantially oxygen-free or inert atmosphere.

9. The process of claim 2 further including step (e) which comprises cooling the treated catalytically-active carbonaceous char to temperatures less than 400° C. under a substantially oxygen-free or inert atmosphere.

10. The process of claim 2 further including step (e) which comprises cooling the treated catalytically-active carbonaceous char is cooled to temperatures less than 100° C. under a substantially oxygen-free or inert atmosphere.

* * * * *